United States Patent
Kasajima et al.

(10) Patent No.: US 6,831,815 B2
(45) Date of Patent: Dec. 14, 2004

(54) HEAD SLIDER PRECISE POSITIONING ACTUATOR INCLUDING A BASE SECTION AND A PAIR OF MOVABLE ARMS

(75) Inventors: Tamon Kasajima, Kwai Chung (HK); Masashi Shiraishi, Kwai Chung (HK)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 173 days.

(21) Appl. No.: 10/125,537

(22) Filed: Apr. 19, 2002

(65) Prior Publication Data

US 2002/0154450 A1 Oct. 24, 2002

(30) Foreign Application Priority Data

Apr. 23, 2001 (JP) ........................................ 2001-124243

(51) Int. Cl.[7] .............................. G11B 5/58; G11B 5/48
(52) U.S. Cl. ................................. 360/294.4; 360/234.6
(58) Field of Search ............................ 360/294.4, 294.1, 360/294.2, 294.3, 234.6

(56) References Cited

U.S. PATENT DOCUMENTS

| | | | | |
|---|---|---|---|---|
| 5,745,319 A | * | 4/1998 | Takekado et al. | 360/78.05 |
| 6,574,077 B1 | * | 6/2003 | Crane et al. | 360/294.3 |
| 6,614,628 B2 | * | 9/2003 | Crane et al. | 360/294.5 |
| 6,671,131 B2 | * | 12/2003 | Kasajima et al. | 360/294.4 |
| 6,690,551 B2 | * | 2/2004 | Shiraishi et al. | 360/294.4 |
| 6,700,749 B2 | * | 3/2004 | Shiraishi et al. | 360/294.4 |
| 2002/0141117 A1 | * | 10/2002 | Kasajima et al. | 360/294.4 |
| 2002/0159192 A1 | * | 10/2002 | Wada et al. | 360/235.8 |
| 2002/0176212 A1 | * | 11/2002 | Ota et al. | 360/294.4 |
| 2003/0001457 A1 | * | 1/2003 | Wang et al. | 310/328 |
| 2003/0147177 A1 | * | 8/2003 | Yao et al. | 360/244.7 |
| 2004/0001288 A1 | * | 1/2004 | Yao et al. | 360/294.3 |
| 2004/0037009 A1 | * | 2/2004 | Yao et al. | 360/294.4 |

FOREIGN PATENT DOCUMENTS

JP      8-180623 A   *   7/1996

* cited by examiner

*Primary Examiner*—Jefferson Evans
(74) *Attorney, Agent, or Firm*—Burns, Doane, Swecker & Mathis, L.L.P.

(57) ABSTRACT

A precise positioning actuator to be fixed to a head slider provided with at least one head element and to a support, for precisely positioning the at least one head element includes a pair of movable arms and a base section. Each movable arm is formed by a plate member including a first metal plate to be substantially in parallel with a side surface of the head slider. Top end sections of the pair of movable arms are capable of displacing in response to a drive signal applied to the actuator along a direction crossing planes of the metal plates. The base section is connected between rear end sections of the pair of movable arms and formed by a plate member including a second metal plate. The base section and the pair of movable arms are formed by adhering the first metal plates and the second metal plate that are individually formed.

37 Claims, 7 Drawing Sheets

HEAD SLIDER PRECISE POSITIONING ACTUATOR INCLUDING A BASE SECTION AND A PAIR OF MOVABLE ARMS

FIELD OF THE INVENTION

The present invention relates to a precise positioning actuator for a head element such as a thin-film magnetic head element or an optical head element, to a head gimbal assembly (HGA) with the actuator and to a manufacturing method of a precise positioning actuator.

DESCRIPTION OF THE RELATED ART

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

Recently, recording and reproducing density along the radial direction or along the track width direction in the magnetic disk (track density) rapidly increase to satisfy the requirement for ever increasing data storage capacities and densities in today's magnetic disk drive apparatus. For advancing the track density, the position control of the magnetic head element with respect to the track in the magnetic disk by a voice coil motor (VCM) only has never presented enough accuracy.

In order to solve this problem, an additional actuator mechanism is mounted at a position nearer to the magnetic head slider than the VCM so as to perform fine precise positioning that cannot be realized by the VCM only. The techniques for realizing precise positioning of the magnetic head are described in for example U.S. Pat. No. 5,745,319 and Japanese patent publication No. 08180623 A.

As for a precise positioning actuator, there are various structures of actuator such as for example a load-beam structure actuator and a piggy-back structure actuator.

The load-beam structure actuator has two piezoelectric elements of PZT attached on a load beam of a suspension. These PZT elements are driven in a manner to support with each other to displace the load beam so as to perform fine precise positioning of a magnetic head slider mounted on the load beam.

The piggy-back structure actuator is formed by piezoelectric material of PZT in an I-character shape with one end section to be fixed to a suspension, the other end section to be fixed to a magnetic head slider and a pillar shaped movable arm connected between these end sections. The PZT is driven to perform fine precise positioning of the magnetic head slider directly attached to this actuator. On the suspension, stepwise stacked are the actuator and the magnetic head slider, namely, the actuator is caught between the suspension and the slider to form a stacked cantilever structure.

However, the aforementioned conventional precise positioning actuators had following various problems:

(1) Mechanical resonance was occurred at a relatively low frequency;
(2) Since the actuator as a whole consists of piezoelectric material such as PZT of a brittle material, shock resistance is very poor. Particularly, since in case of a piggy-back structure actuator, the actuator and the magnetic head slider are stacked to form a cantilever structure, a shock easily occurs with a moment and also shock resistance is extremely poor;
(3) Depending upon the size of the magnetic head slider, a travel of the magnetic head element during the precise positioning operation varies. Thus, it is difficult to obtain enough stroke;
(4) Handling at the tire of an assembly of the HGA is very difficult;
(5) Particularly, in case of a piggy-back structure actuator, because of the stepwise stacked structure, a total thickness of the HGA around the magnetic head slider increases by the thickness of the actuator;
(6) In case of a piggy-back structure actuator, because of three-dimensional and complicated attachment structure, the handling at the time of an assembly of the HGA is extremely difficult and it is impossible to use a conventional HGA assembly equipment causing productivity to be very worse; and
(7) In order not to interfere with the movement of the piggy-back structure actuator, it is necessary to assemble with keeping a gap between the actuator and the magnetic head slider and also between the actuator and the suspension. However, forming of such gaps will more decrease the shock resistance and it is difficult to precisely keep the gaps constant. Particularly, since it is difficult to keep the suspension, the actuator and the magnetic head slider in parallel precisely, the head characteristics deteriorates.

To solve the aforementioned various problems, the inventors of this application had proposed an actuator provided with a pair of metal plate movable arms for fixing and catching a magnetic head slider in a space between the movable arms (U.S. Pat. Ser. No. 09/972,939 now pending).

This proposed actuator is fabricated by cutting each pattern for the actuator from a metal plate and by bending the pattern along predetermined lines to form a three-dimensional structure of the actuator. However, since the metal plate used for the movable arms of the actuator must have a relatively large thickness of about 50 to 70 $\mu$m, it is very difficult to correctly bend the pattern of metal plate along precise lines at a precise angle.

SUMMARY OF THE INVENTION

It is therefore an object of the present invention to provide a precise positioning actuator for a head element, an HGA with the actuator and a manufacturing method of a precise positioning actuator, whereby the actuator can be fabricated without bending a metal plate.

According to the present invention, a precise positioning actuator to be fixed to a head slider provided with at least one head element and to a support, for precisely positioning the at least one head element includes a pair of movable arms and a base section. Each movable arm is formed by a plate member including a first metal plate to be substantially in parallel with a side surface of the head slider. Top end sections of the pair of movable arms are capable of displacing in response to a drive signal applied to the actuator along a direction crossing planes of the metal plates. The base section is connected between rear end sections of the pair of movable arms and formed by a plate member including a second metal plate. The base section and the pair of movable arms are formed by adhering the first metal plates and the second metal plate that are individually formed. Also, according to the present invention, an HGA includes a head slider provided with at least one head element, a support and this precise positioning actuator fixed to the head slider and to the support for precisely positioning the at least one head element.

Since the base section and the pair of movable arms are formed by adhering metal plates that are individually formed, it is possible fabricate them without bending a metal plate. Therefore, the fabrication of the actuator becomes easy and a high precision actuator can be obtained.

Also, the movable arms and the base section are mainly made from a metal plate, the weight of the whole actuator can be reduced and thus a mechanical resonance frequency of the actuator can be increased. Further, as a basic member of the arms is formed by the metal plate that is strong and light-weighted, a shock resistance of the movable arms that are particularly weaken for the shock can be greatly improved. Due to the usage of the metal plate provided with a high mechanical strength, treatment of the actuator during assembling of the HGA becomes very easy. By using the metal plate to form the main portion of the actuator, the flexibility on a design of the actuator will improve with the shape and/or size. Thus, it is enabled to design the actuator with a sufficient stroke. Furthermore, because the metal plate can be precisely machined, accuracy in size of the actuator itself can be greatly improved.

Also, since the head slider will be mounted in a space between the movable arms, the thickness of the HGA around the head slider (Z-height) does not increase even if the actuator is attached. Thus, no modifications in size of the disk drive apparatus due to the mounting of the actuator is necessary. In addition, since the head slider is caught in between the movable arms, the top end sections of the movable arms, which actually transfer the displacement to the slider, can be extended to always position at the top end of the slider. Thus, it is possible to provide a constant travel to the slider even if the size of the head slider changes, and therefore an enough stroke of the head at the precise positioning operation can be always obtained.

It is preferred that a resin layer is laminated on outer surfaces of the pair of able arms and the base section.

It is also preferred that the actuator further includes spacers formed on inner surfaces of the top end sections of the pair of movable arms, the spacers being to be fixed to the side surfaces of the head slider so as to provide air gaps between the side surfaces of the head slider and the pair of movable arms, respectively. Since the side surfaces of the head slider does not contact with the movable arms due to the air gap provided by the spacers, displacement of the head slider becomes free. In this case, the spacers may be individually formed from the pair of movable arms, or formed by a part of a resin layer of the movable arm.

It is further preferred that the actuator further includes a coupling section connected between the top end sections of the pair of movable arms and substantially in parallel with an upper surface of the head slider. The upper surface that is opposite to an air bearing surface (ABS) is to be fixed to the coupling section. Since the actuator is provided with a coupling section connected between the top end sections of the pair of movable arms and the head slider is to be fixed to this coupling section, fixing of the slider can be achieved with sufficient strength and a shock resistance against up-and-down movements can be greatly improved. Also, head sliders with different widths can be easily mounted to the actuator.

It is preferred that the coupling section is formed only by a resin layer.

It is also preferred that the pair of movable arms, the base section and the coupling section have a U-shaped section structure.

It is preferred that the resin layer is a polyimide resin layer. Also, preferably, the metal plate is a stainless steel plate.

It is further preferred that each of the pair of movable arms includes an arm member made of the plate member including the metal plate, and a piezoelectric element formed or adhered on a side surface of the arm member.

It is preferred that the at least one head element is at least one thin-film magnetic head element.

According to the present invention, furthermore, a manufacturing method of a precise positioning actuator to be fixed to a head slider provided with at least one head element and to a support, for precisely positioning the at least one head element, the method includes a step of forming, from a plate member fabricated by laminating at least one resin layer and at least one metal plate, a pair of movable arms each including a part of the at least one metal plate and a displacement generation element formed on one surface of the movable arm, and a base section connected between rear end sections of the pair of movable arms and including a part of the at least one metal plate separated from the parts of the at least one metal plates of the pair of movable arms by a predetermined space, a step of forming, from the plate member, a base section coupling member made of the at least one resin layer to couple the pair of movable arms and the base section, a step of bending the base section coupling member so that the pair of movable arms become substantially perpendicular to the base section, and a step of adhering the base section and the pair of movable arms with each other under the bending state of the base section coupling member.

The metal plate for the movable arms and the metal plate for the base section are formed to be separated themselves by a predetermined space but coupled by means of the resin layer, then the resin layer is bent so that the movable arms become substantially perpendicular to the base section, and the base section and the movable arms are adhered to each other under the bending state. Since the metal plates are separated and the resin layer for coupling the metal plates is bent, it is possible fabricate the actuator without bending the metal plates. Therefore, the fabrication of the actuator becomes easy and a high precision actuator can be obtained.

It is preferred that the method further includes a step of forming spacers on inner surfaces of top end sections of the pair of movable arms, the spacers being to be fixed to side surfaces of the head slider so as to provide air gaps between the side surfaces of the head slider and the pair of movable arms, respectively. Since the side surfaces of the head slider does not contact with the movable arms due to the air gap provided by the spacers, displacement of the head slider becomes free. In this case, the spacers forming step may include etching the plate member to remain parts of the resin layers of the pair of movable arms, or include preparing members individually formed from the pair of movable arms, and adhering the members to the inner surfaces of the top end sections of the pair of movable arms.

It is also preferred that the method further includes a step of forming a coupling section connected between top end sections of the pair of movable arms and substantially in parallel with an upper surface of the head slider. The upper surface that is opposite to an air bearing surface (ABS) is to be fixed to the coupling section.

It is further preferred that the coupling section is made of only the at least one resin layer.

It is preferred that the predetermined space of the metal plates is larger than a thickness of the at least one metal plate. If the space is less than the thickness of the at least one metal plate, the metal plates cannot be perpendicularly adhered to each other. Contrary to this, if the space is too large, the resin layer may sag and it may be difficult to adhere the metal plates in perpendicular.

It is also preferred that the base section is formed by folding the at least one metal plate. If the metal plate for the base section and the movable arms are patterned by etching, side edges of the metal plates are formed in tapered shapes. Thus, it will be difficult to perpendicularly fix the metal plates to each other. However, if the base section is formed by folding the at least one metal plate, tops of the side edges of both the folded metal plates abut to the metal plate members for the movable arms when bending. Thus, it is easy to perpendicularly fix the metal plate for the base section and the metal plate members for the movable arms to each other.

Further objects and advantages of the present invention will be apparent from the following description of the preferred embodiments of the invention as illustrated in the a carrying drawings.

DESCRIPTION OF THE PREFERRED EMBODIMENTS

Figure 1:
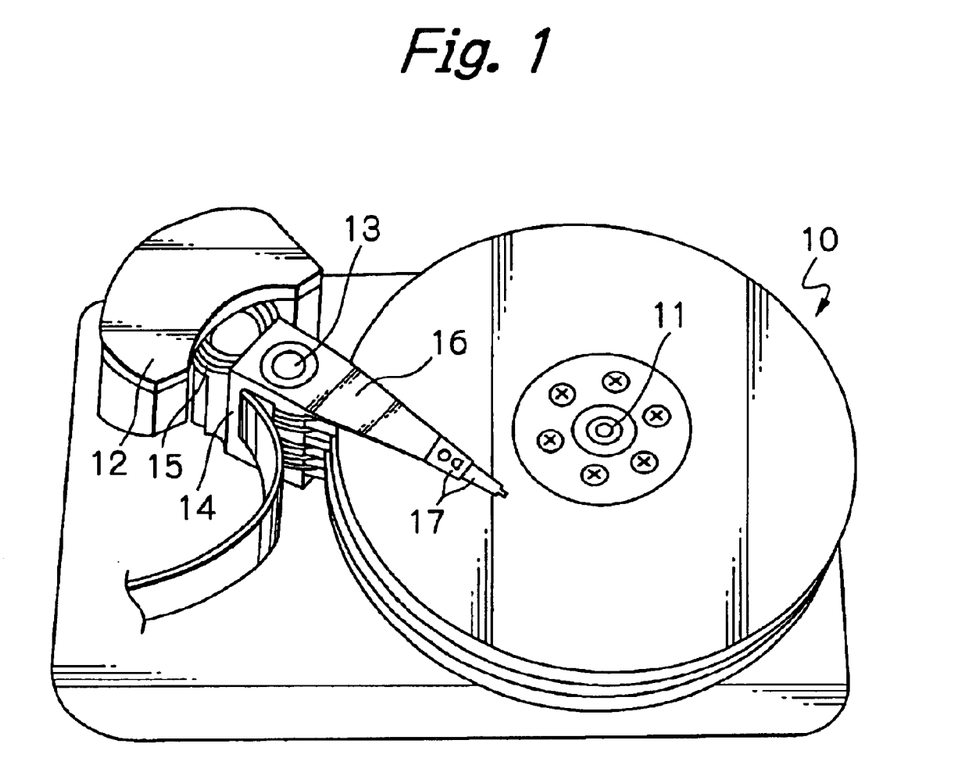
FIG. 1 is an oblique view schematically illustrating main components of a magnetic disk drive apparatus in a preferred embodiment according to the present invention.
Figure 2:
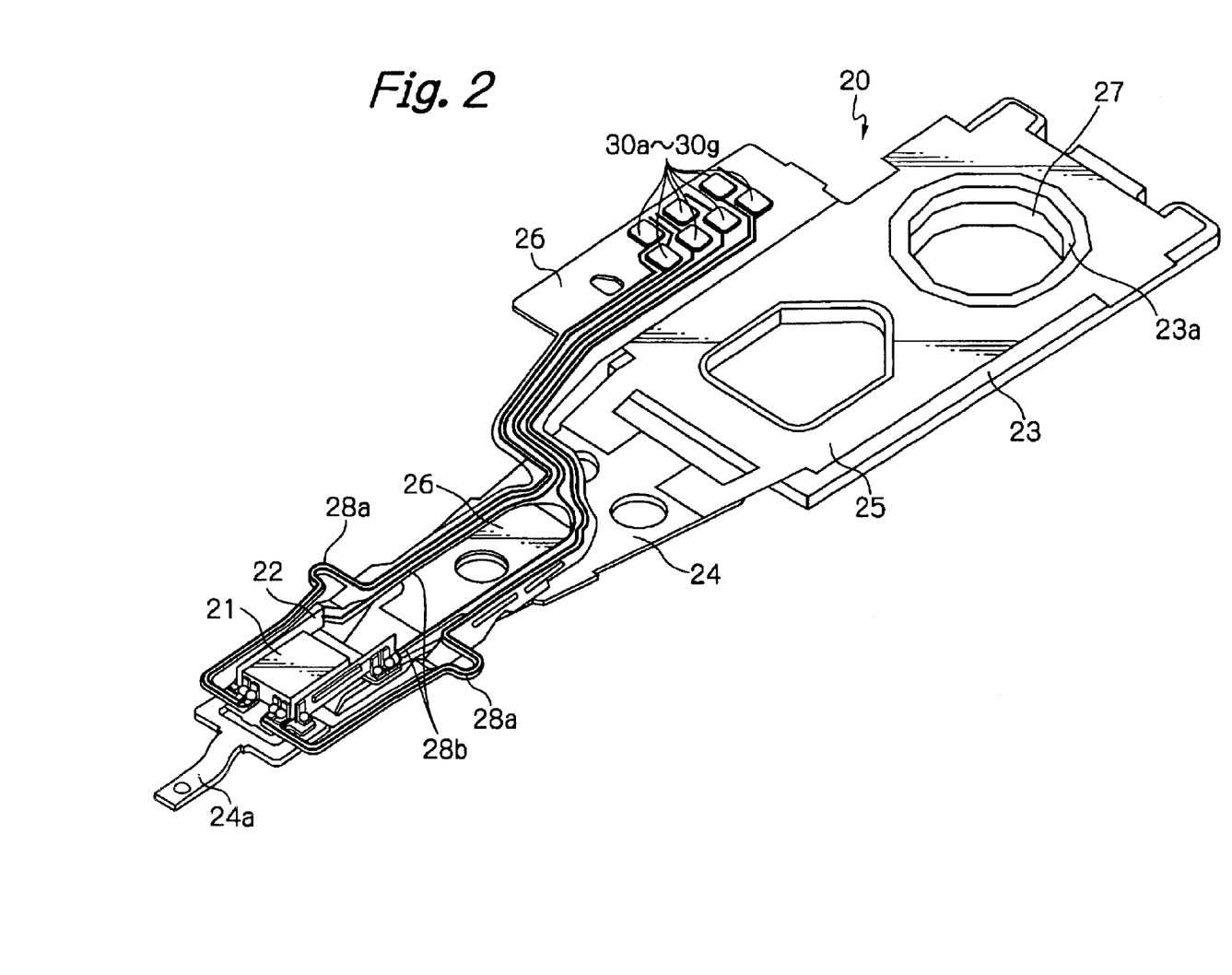
FIG. 2 is an oblique view illustrating the whole structure of an HGA in the embodiment of FIG. 1.
Figure 3:
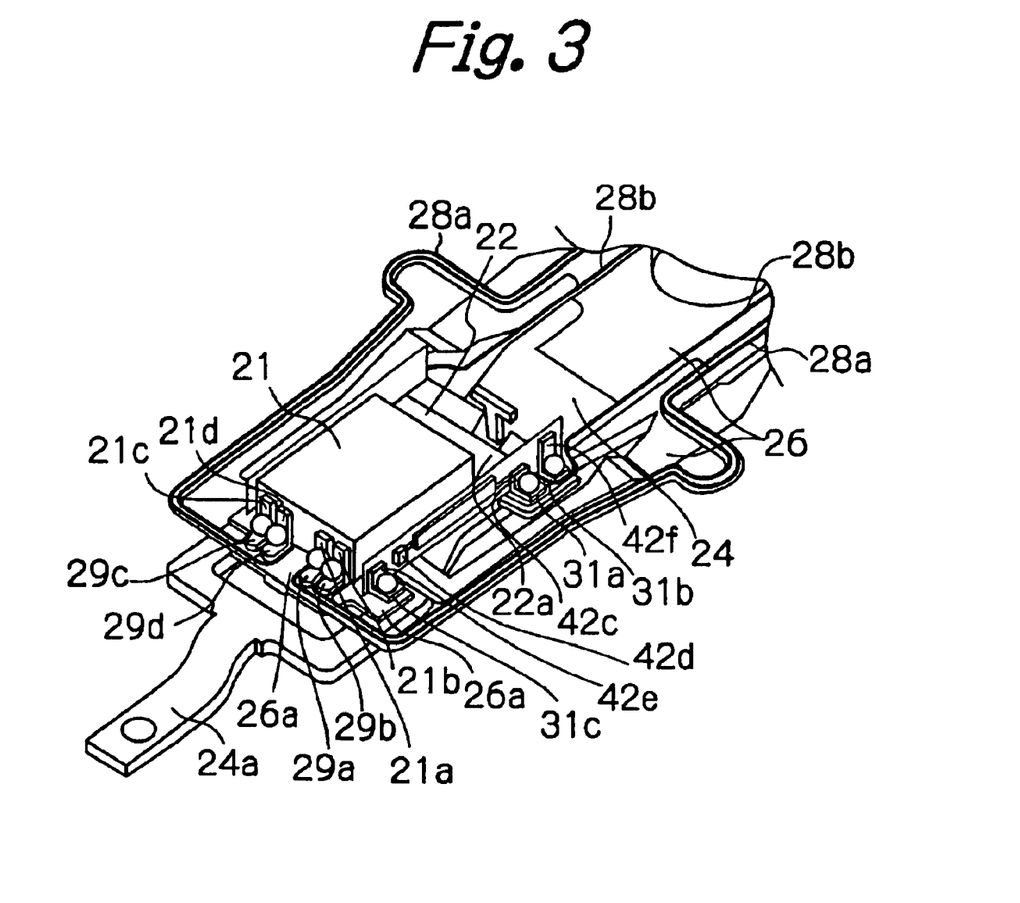
FIG. 3 is an oblique view illustrating an enlarged top end section of the HGA in the embodiment of FIG. 1.

FIG. 1 illustrates main components of a magnetic disk unit of a preferred embodiment according to the present invention, FIG. 2 illustrates the whole structure of an HGA in this embodiment, and FIG. 3 illustrates an enlarged top end section of the HGA in this embodiment.

In FIG. 1, reference numeral 10 denotes a plurality of magnetic hard disks rotating around an axis 11, and 12 denotes an assembly carriage device for positioning each magnetic head element on a track of each disk. The assembly carriage device 12 is mainly constituted by a carriage 14 capable of rotating around an axis 13 and a main actuator 15 such as for example a voice coil motor (VCM) for driving the carriage 14 to rotate.

Base sections at one ends of a plurality of drive arms 16 stacked along the axis 13 are attached to the carriage 14, and one or two HGAs 17 are mounted on a top section at the other end of each arm 16. Each of the HGAs 17 has a slider mounted at its top end section so that the slider opposes to one surface (recording and reproducing surface) of each of the magnetic disks 10.

As shown in FIGS. 2 and 3, the HGA is assembled by fixing a fine tracking actuator 22 for precise positioning of a thin-film magnetic head element to a top end section of a suspension 20. A surface that is opposite to an air bearing surface (ABS) of a magnetic head slider 21 provided with the thin-film magnetic head element is fixed to the actuator 22 so that the slider 21 is caught in a space between movable arms of the actuator 22.

A main or course actuator of VCM 15 shown in FIG. 1 is used for rotationally moving the drive arm 16 to which such HGA is attached, so as to move the whole assembly. The actuator 22 contributes the fine positioning of the HGA, which cannot be adjusted by the main or course actuator 15.

The suspension 20 is substantially formed, as shown in FIGS. 2 and 3, by first and second load beams 23 and 24, a resilient hinge 25 coupled with both these first and second load beams 23 and 24, a resilient flexure 26 fixed on the second load beam 24 and the hinge 25, and a circular base plate 27 formed at an attaching section 23a of the first load beam 23.

The flexure 26 has a flexible tongue (not shown) depressed by a dimple (not shown) formed on the second load beam 24 at its one end section. On the tongue, fixed is a base section 22a (40) of the actuator 22 directly or via an insulation layer made of for example polyimide.

The flexure 26 has elasticity for supporting flexibly the magnetic head slider 21 through the actuator 22 by this tongue. The flexure 26 is made of in this embodiment a stainless steel plate (for example SUS304TA) with a thickness of about 20 $\mu$m. The flexure 26 is fixed with the second load beam 24 and with the hinge 25 at a plurality of points by pinpoint welding.

The hinge 25 has elasticity providing, to the second load beam 24, a force for pressing the magnetic head slider 21 toward the direction of a magnetic disk surface through the actuator 22 in operation. The hinge 25 is made of in this embodiment a stainless steel plate with a thickness of about 40 $\mu$m.

The first load beam 23 is made of in this embodiment a stainless steel plate with a thickness of about 100 $\mu$m, and supports the whole surface of the hinge 25. The fixing of the first load beam 23 with the hinge 25 is performed by pinpoint welding at a plurality of points.

The second load beam 24 is also made of in this embodiment a stainless steel plate with a thickness of about 100 $\mu$m, and fixed to the hinge 25 at its rear end section. The fixing of the second load beam 24 with the hinge 25 is performed also by pinpoint welding at a plurality of points. At a top end of this second load beam 24, formed is a lift-tab 24a for separating the HGA from the magnetic-disk surface during out of operation is prepared.

The base plate 27 to be attached to the drive arm 16 shown in FIG. 1 is made of in this embodiment a stainless steel or iron plate with a thickness of about 150 $\mu$m. This base plate 27 is fixed to the attaching section 23a of the first load beam 23 by welding.

On the flexure 26, flexible first and second conductor member 28a and 28b each including a plurality of trace conductors of a thin-film multi-layered pattern are formed or disposed. The first and second conductor members 28a and 28b are formed by a known method similar to the patterning method of forming a printed circuit board on a thin metal plate such as a flexible printed circuit (FPC). For example, the first and second conductor members 28a and 28b are formed by sequentially depositing a first insulation material layer made of a resin such as polyimide with a thickness of about 5 μm, a patterned Cu layer (trace conductor layer) with a thickness of about 4 μm, and a second insulation material layer made of a resin such as polyimide with a thickness of about 5 μm on the flexure 26 in this order. Within the regions of the connection pads formed for connecting with the actuator, the magnetic head element and an external circuit, an Au layer is deposited on the Cu layer and there is no second insulation material layer on the Au layer.

In this embodiment, the first conductor member 28a includes two trace conductors connected to the magnetic head element for one side, thus four trace conductors for both sides, and the second conductor member 28b includes a trace conductor connected to the actuator 22 for one side, thus two trace conductors for both sides.

One end of the trace conductors of the first conductor member 28a is electrically connected to head element connection pads 29a–29d for on an individually separated and freely movable section 26a of the flexure 26. The connection pads 29a–29d are bonded to terminal electrodes 21a of the magnetic head slider 21 by Au-ball bonding, wire bonding or stitch bonding. A portion of the first conductor member 28a between the separated section 26a and the flexure 26 is air-floating. No metal thin-plate is formed on the back surface of this air-floating portion of the first conductor member 28a so as to reduce the resistance for the movement of the magnetic head slider 21. The other end of the trace conductors of the first conductor member 28a is electrically connected to four connection pads of external circuit connection pads 30a–30g used for connection with an external circuit.

One end of trace conductors of the second conductor member 28b is electrically connected to actuator connection pads (pad 31a and unshown pad located at the opposite side of the actuator) formed on an insulation layer on the tongue of the flexure 26. These connection pads are connected to a B channel signal terminal 42c and an A channel signal terminal formed on movable arms 42 and 43 (FIG. 4) of the actuator 22, respectively. The other end of trace conductors of the second conductor member 28b is electrically connected to two pads of the external circuit connection pads 30a–30g. In this embodiment, the second conductor member 28b has no ground trace conductor and thus ground connection pads (pad 31b and unshown pad located at the opposite side of the actuator) are directly connected to the tongue of the flexure 26 so as to be grounded to the drive arm 16 through the second load beam 24, the hinge 25, the first load beam 23 and the base plate 27. Ground connection pads (pad 31c and unshown pad located at the opposite side of the actuator) are directly connected to the separated section 26a. These ground connection pads (31b, 31c) are electrically connected with each other through the metal plate member of the actuator 22.

A structure of the HGA according to the present invention is not limited to the aforementioned structure. Furthermore, although it is not shown, a head drive IC chip may be mounted on a middle of the suspension 20.

Figure 4:
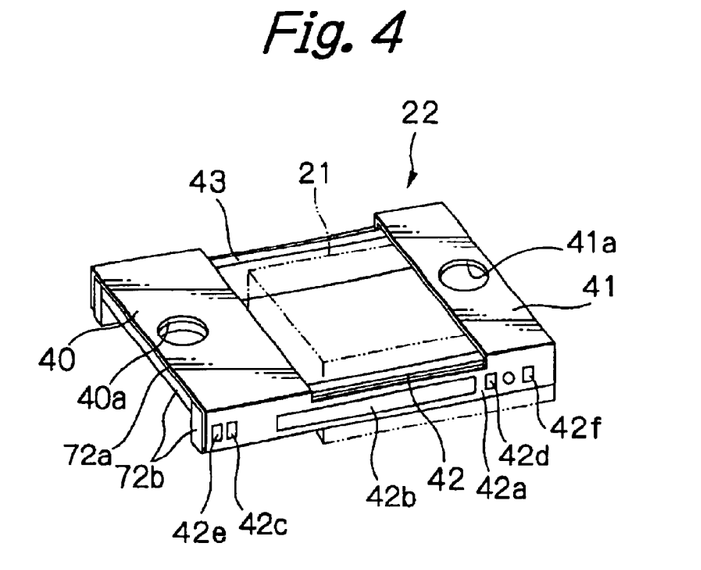
FIG. 4 is an oblique view illustrating a structure of an actuator in the embodiment of FIG. 1.
Figure 5:
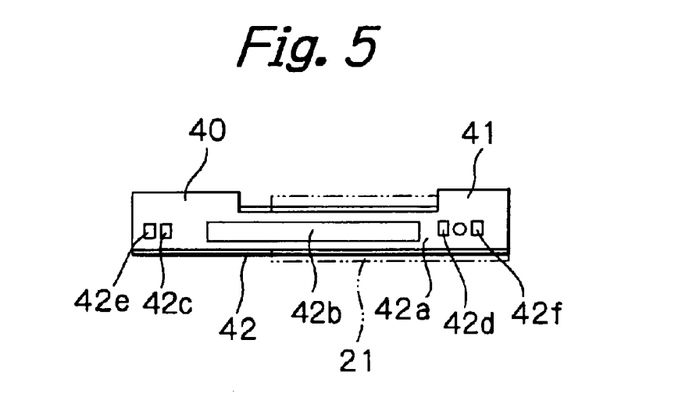
FIG. 5 is a side view illustrating the structure of the actuator of FIG. 4.
Figure 6:
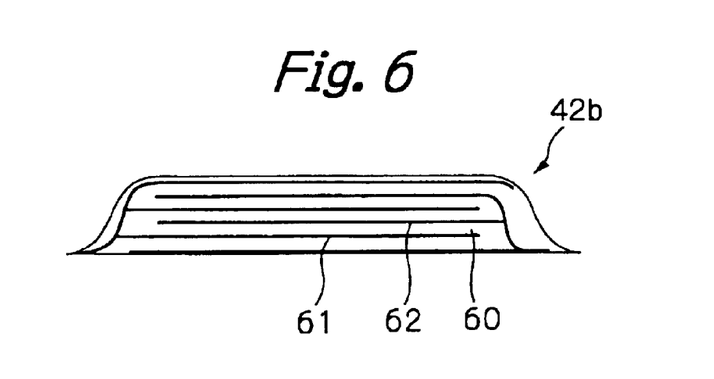
FIG. 6 is a sectional view illustrating a structure of a piezoelectric element section of the actuator shown in FIGS. 4 and 5.
Figure 7A:
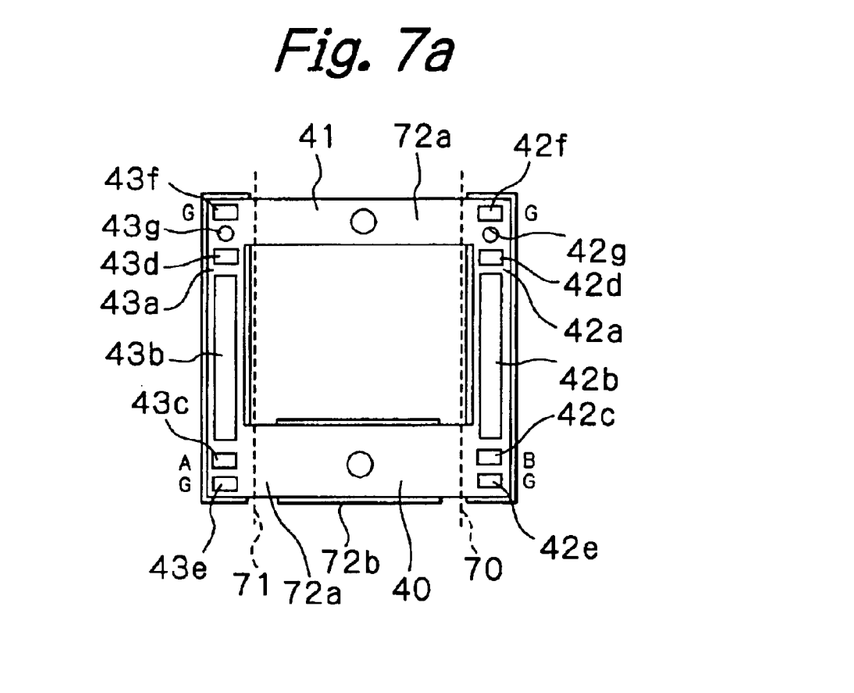
FIGS. 7a and 7b are top and bottom views illustrating an actuator in a state before bending in the embodiment of FIG. 1.
Figure 7B:
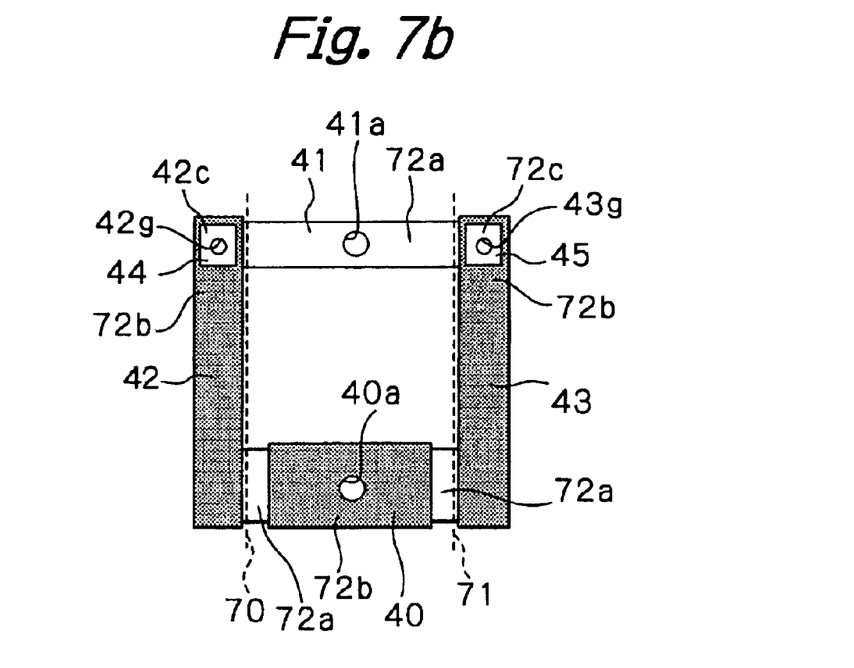

FIG. 4 illustrates a structure of the actuator 22 in the embodiment of FIG. 1, FIG. 5 shows a side view of FIG. 4, FIG. 6 illustrates a structure of a piezoelectric element section of the actuator 22, and FIGS. 7a and 7b illustrate the actuator in a state before bending in this embodiment.

FIGS. 4 and 5 are indicated by turning the actuator shown in FIGS. 2 and 3 upside down and thus the upper surface of a base section of the actuator will be fixed to the suspension. FIGS. 7a and 7b indicate a flat state actuator before bending, and particularly FIG. 7a indicates a top surface to be fixed to the flexure 26 and FIG. 7b indicates a top surface to be fixed to the magnetic head slider 21. The actuator is formed in fact by outwardly bending its parts along broken lines 70 and 71 in FIG. 7a and by inwardly bending its parts along the broken lines 70 and 71 in FIG. 7b.

As will be noted from FIGS. 4 and 7, the main portion (frame) of the actuator 22 in this embodiment is fabricated by etching a three-layered structure plate member with a first resin layer 72a, a metal layer or a metal plate member 72b and a second resin layer 72c sequentially laminated in this order in a predetermined pattern for each layer, and by bending the pattern it into three dimensional shape. Namely, as shown in FIGS. 4 and 5, each actuator member cut out by etching is substantially perpendicularly bent along lines inside from the both side edges of a strip-shaped base section 40, upper surface of which will be fixed to the suspension, and of a strip-shaped coupling section 41, lower surface of which will be fixed to the magnetic head slider. Thus, a pair of movable arms 42 and 43 of the actuator run in parallel with each other keeping substantially perpendicular to the base section 40 and the coupling section 41. Since the actuator is formed by bending at inside positions from the side end edges of the coupling section 41, each of the movable arms 42 and 43 is shaped in a strip-shaped plane plate. In order to obtain large stroke in response to a lower driving force, it is very important that the whole of each movable arm is formed in a plane plate shape.

The movable arms 42 and 43 are formed in parallel to side surfaces of the magnetic head slider 21, and the base section 40 and the coupling section 41 are formed in parallel to a surface which is opposite to the ABS of the magnetic head slider 21.

The base section 40 is formed in a two-layered structure of the first resin layer 72a and the metal plate member 72b, whereas the coupling section 41 is formed in a single layer structure of only the first resin layer 72a. The major portion of each of the movable arms 42 and 43 is formed in a two-layered structure of the first resin layer 72a and the metal plate member 72b, but the top end section thereof is formed in a three-layered structure of the first resin layer 72a, the metal plate member 72b and the second resin layer 72c. The patterns of the second resin layer 72c remained inside of the top end sections of the movable arms 42 and 43 function as spacers 44 and 45.

As shown in FIG. 7b, before bending, patterns of the metal plate member 72b in the base section 40 and in the movable arms 42 and 43 are separated from each other with a predetermined distance there between, and coupled by the first resin layer 72a. The bending is not performed at a region of the metal plate member 72b but is performed at a region of the first resin layer 72a. After bending, the pattern of the metal plate member 72b in the base section 40 and the pattern of the metal plate member 72b in the movable arms 42 and 43 are adhered with each other. Since the region of the first resin layer 72a is bent, the bending process can become extremely easy even when the metal plate member 72b thickens to 50 to 70 μm or more.

The spacers 44 and 45 are provided to make air gaps between the movable arms 51 and 52 and the side surfaces of the magnetic head slider 21. Since the side surfaces of the magnetic head slider 21 does not contact with the movable arms 51 and 52 due to the air gap, displacement of the magnetic head slider 21 becomes free. The spacers may be formed by fixing separately fabricated plate members to the inside of the top end sections of the movable arms instead of remaining the top end sections of the resin layer of the three-layered structure movable arms 42 and 43.

The movable arms 42 and 43 consist of arm member 42a and 43a (FIG. 7a), piezoelectric elements 42b and 43b (FIG. 7a) formed on outside surfaces of the arm members 42a and 43a, respectively, the signal terminals 42c and 43c (FIG. 7a) of the piezoelectric elements 42b and 43b, and ground terminals 42d, 43d, 42e, 43e, 42f and 43f (FIG. 7a). The ground terminals 42d, 43d, 42e, 43e, 42f and 43f are directly connected to the metal plate member of the actuator. In this embodiment, the piezoelectric elements, the signal terminals and the ground terminals are formed on the outside surfaces of the arm members. However, it is possible to form then on the inside surfaces of the arm members. The latter is preferable because a region for catching the actuator by a jig will increase.

The base section 40, the coupling section 41 and the arm members 42a and 43a are fabricated from the plate member with a three-layered structure. As for the metal plate member 72b of this three-layered structure plate member a resilient plate spring material such as a carbon steel plate, a copper alloy plate (for example a copper titanium plate, a phosphor bronze plate or a beryllium copper plate), or a titanium plate may be used other than an alloy steel plate such as the stainless steel plate. In case that the piezoelectric elements are formed by printing and sintering, a good heat resistance material should be used as the metal plate. The first and second resin layers 72a and 72c may be made of a polyimide resin material for example.

Each of the piezoelectric elements 42b and 43b has, as shown in FIG. 6, a multi-layered structure of alternately laminating piezoelectric material layers 60, signal electrode layers 61 and ground (common) electrode layers 62. By applying voltage across the signal electrode layers 61 and the ground (common) layers 62, the piezoelectric material layers 60 expand and contract. The piezoelectric material layer 60 is made of material that expands and contracts by reverse piezoelectric effect or by electrostrictive effect. The signal electrode layers 61 are electrically connected to the B channel signal terminal 42c or the A channel signal terminal 43c, and the ground electrode layers 62 are electrically connected to the ground terminal 42d or 43d.

In case that the layers 60 are made of piezoelectric material such as PZT (Lead Zirconate Titanate Oxidization), these piezoelectric material layers are in general polarized so as to improve their displacement performance. The polarized direction is the lamination direction of the piezoelectric material layers 60. When voltage is applied across the electrode layers and the direction of the produced electrical field is the same as the polarized direction, the piezoelectric material layer between the electrode layers expands in its lamination direction (piezoelectric longitudinal effect) and contracts in its in-plane direction (piezoelectric lateral effect). Contrary to this, when the direction of the produced electrical field is in inverse as the polarized direction, the piezoelectric material layer between the electrode layers contracts in its lamination direction (piezoelectric longitudinal effect) and expands in its in-plane direction (piezoelectric lateral effect).

If the voltage with a polarity which will induce the contraction or expansion is applied to the piezoelectric element, the piezoelectric element contracts or expands in response to the applied voltage polarity and thus the movable arm 42 or 43 bends to trace a S-character resulting the top end section of the arm 42 or 43 to laterally and linearly displace. Thus, the magnetic head slider 21 fixed with the actuator 22 also laterally and linearly displaces. Since the slider displaces namely oscillates with linear motion not swinging or rotational motion, more precise positioning of the magnetic head element can be expected.

It is possible to apply voltages that induce mutually reverse motions may be simultaneously applied to the piezoelectric elements 42b and 43b, respectively. In other words, AC voltages may be simultaneously applied to the piezoelectric elements 42b and 43b so that one piezoelectric element expands when the other piezoelectric element contracts and vice versa. The oscillation of the movable arms is centered when no voltage is applied to the piezoelectric elements.

However, one of the piezoelectric elements is expanded and therefore the direction of the driving voltage opposes to that of the polarization in the piezoelectric material layer. Thus, if the applied voltage is high or the voltage is continuously applied, attenuation in polarization of the piezoelectric material layer may occur. It is desired therefore that a constant DC bias voltage in the same direction as the polarization direction be additionally applied to the AC voltage to form the driving voltage so that the direction of the driving voltage never opposes to that of the polarization in the piezoelectric material layer. The oscillation of the movable arms is centered when only the bias voltage is applied to the piezoelectric elements.

In this specification, the piezoelectric material is material that expands or contracts by their reverse piezoelectric effect or electrostrictive effect. Any piezoelectric material applicable for the piezoelectric elements of the actuator can be used. However, for high rigidity, it is desired to use a ceramics piezoelectric material such as PZT[Pb(Zr,Ti)O$_3$], PT(PbTiO$_3$), PLZT[(Pb,La)(Zr,Ti)O$_3$], or barium titanate (BaTiO$_3$).

Each of the piezoelectric elements may have a single layer structure of alternately laminating a piezoelectric material layer, a signal electrode layer and a ground (common) electrode layer.

FIGS. 8a to 8e are elevation views seen from the rear end side (element forming surface side) of the actuator, illustrating a part of a manufacturing process of the actuator and an assembling process of the actuator and the magnetic head slider in the embodiment of FIG. 1. In the figures, however, only one actuator is indicated to simplify the illustration. Hereinafter, the manufacturing process of the actuator will be described with reference to these figures.

Figure 8A:
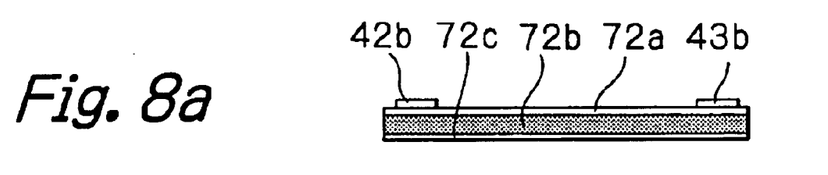
FIGS. 8a to 8e are elevation views illustrating a part of a manufacturing process of the actuator and an assembling process of the actuator and the magnetic head slider in the embodiment of FIG. 1.

First, many of regions for actuators are set in matrix on a first resin layer 72a of a three-layered structure plate member formed by laminating the first resin layer 72a and a second resin layer 72c on both surfaces of a resilient metal plate member 72b such as a stainless plate. Then, as shown in FIG. 8a, piezoelectric elements 42b and 43b and conductor patterns consisting of lead conductors electrically connected with the piezoelectric elements 42b and 43b and terminal electrodes are formed in each region by sputtering and photolithography. More concretely, in each region, a PZT layer is deposited by sputtering over the whole surface of the metal plate, the deposited PZT layer is patterned by photolithography, a conductor layer is deposited by sputtering over the whole surface, and then the conductor layer is patterned by photolithography to form the conductor patterns consisting of the lead conductors and the terminal electrodes. Thereafter, these processes are repeatedly executed to form the multi-layered structure of the piezoelectric element and the conductor patterns. The conductor patterns consisting of the lead conductors and the terminal electrodes are formed by a patterned Cu layer on an insulation layer of resin material such as polyimide. Within the areas of the terminal electrodes, an Au layer is additionally laminated on the Cu layer.

The PZT layer of the piezoelectric elements 42b and 43b may be formed on the metal plate member 72b by using a gas deposition method in which ultra fine particles are impacted at high speed other than by using the above-mentioned thin-film method such as sputtering. This gas deposition method utilizes fast deposition due to high speed impact of an ultrafine particle beam and deposits at a high speed PZT ultrafine particles with a relatively low surface activity, formed by a mechanical rushing method, on a metal plate (J. Akedo, "Deposition method using an ultrafine particle beam and its application to microfabrication", Jpn. Appl. Phys. Vol.68, No. 1, 1999, pp.44–47). According to this gas-deposition method, a thick-film of PZT can be deposited on a metal plate in a low process temperature.

In a modification, piezoelectric elements 42b and 43b, and conductor patterns consisting of lead conductors electrically connected with the piezoelectric elements and terminal electrodes may be formed by printing, then this printing process be repeatedly executed to form a multi-layered structure and thereafter the formed multi-layered structure be sintered.

Figure 8B:
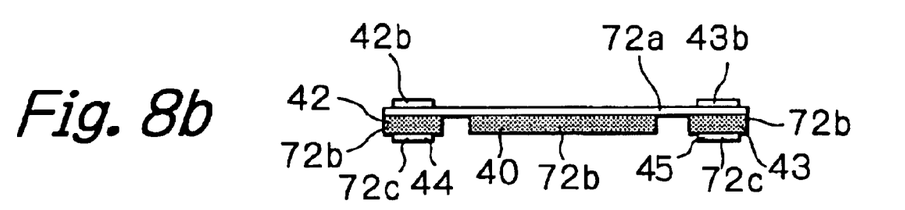
Figure 8C:
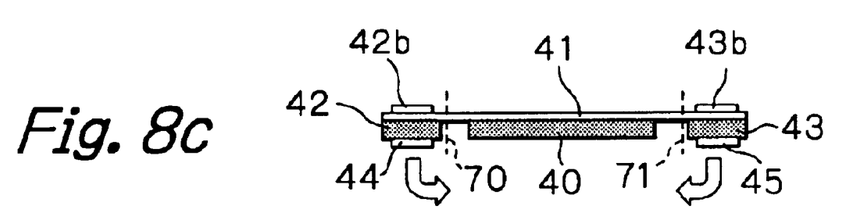

Then, as show in FIGS. 8b, 7a and 7b, partials region of the first resin layer 72a, the metal plate member 72b and the second layer 72c are selectively removed by etching to form predetermined patterns. Namely, as shown in FIGS. 7b and 8b, the metal plate member 72b is etched to remain only regions of the base section 40 and the movable arms 42 and 43 and also to separate the base section 40 and the movable arms 42 and 43 with each other by a predetermined distance that is relatively larger than a thickness of the metal plate member 72b. The first resin layer 72a is etched as shown in FIG. 7a to shape a rectangular frame including the base section 40 and the movable arms 42 and 43. Also, the second resin layer 72c is etched as shown in FIG. 7b to remain only regions at the top end sections of the movable arms 42 and 43 to form the spacers 44 and 45.

Such selective etching will be performed in case that the metal plate member 72b is a stainless steel plate and the resin layers 72b and 72c are polyimide resin layers as follows.

The stainless steel plate is etched using an acid such as $FeCl_3$ (ferric chloride). Such acid selectively etches only the stainless steel plate but does not etch the polyimide layer at all. Thus, the polyimide resin layer operates as a stop layer and therefore within an etched region the stainless steel plate is completely removed over the whole thickness. Accordingly, it is possible to easily control the etched depth at constant. The polyimide resin layers are etched by a wet etching using an alkali such as KOH (potassium hydroxide) or by a dry etching using for example $O_2$ plasma or $CF_4$ plasma. Such wet or dry etching selectively etches only the polyimide layer but does not etch the stainless steel plate at all. Thus, the stainless steel plate operates as stop a layer and therefore within etched regions only the polyimide resin layers are completely removed.

Figure 8D:
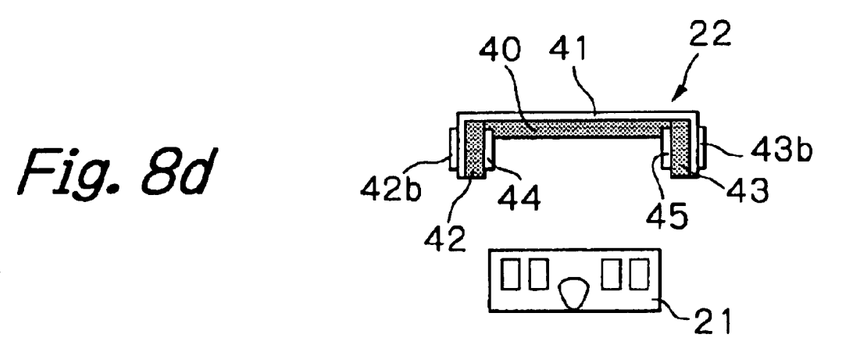

Then, after coating an adhesive between the metal plate member for the base section 40 and the metal plate member for the movable arms 42 and 43, the first resin layer 72a is bent along broken lines 70 and 71 toward rows respectively as shown in FIG. 8b, and then the metal members of the base section 40 and the movable arms 42 and 43 are adhered with each other. Thus, the actuator 22 with a three-dimensional structure shown in FIGS. 4 and 8d is formed.

Figure 8E:
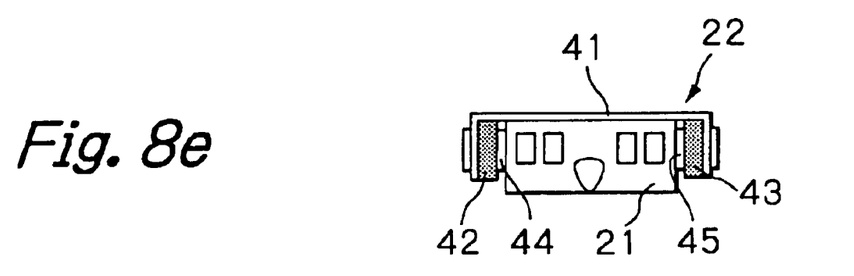

In order to assemble an HGA, using such actuator 22, first, an adhesive such as a thermosetting epoxy resin family adhesive or a UV resin family adhesive is coated on a part of a surface opposite to the ABS of the magnetic head slider 21 and also an adhesive such as a thermosetting epoxy resin family adhesive or a UV resin family adhesive is coated on a part of side surfaces of the slider 21, to which the spacers 44 and 45 are to be fixed. Then, the actuator 22 is disposed on the slider 21 such that the coupling section 41 and the spacers 44 and 45 of the actuator 22 contact to the adhesive coated parts of the slider 21. The actuator and the slider are kept at this state until the adhesive is cured. An assembly of the magnetic head slider 21 and the actuator 22 is thus formed as shown in FIG. 8e.

Since assembling of the magnetic head slider 21 and the actuator 22 can be carried out on the flat plate, alignment of the slider and the actuator becomes easy resulting that a higher accuracy assembling can be expected.

Then, the assembly of the magnetic head slider 21 and the actuator 22 is fixed on the flexure 26 of the suspension 20 as shown in FIG. 3. More concretely, adhesive is coated on the insulation layer on the tongue of the flexure 26 and on the separated section 26a of the flexure 26, respectively, and the base section 22a (40) of the actuator 22 of the assembly and the top end section of the magnetic head slider 21 of the assembly are adhered on the insulation layer and on the separated section 26a, respectively. It is desired that the fixing between the top end section of the magnetic head slider 21 and the separated section 26a is achieved by means of a conductive adhesive.

Then, the B channel signal terminal 42c and the A channel signal terminal 43c of the actuator 22 are electrically connected with the actuator connection pads 31a and 31b by soldering or using silver containing epoxy resin, respectively. If the soldering is used for the connection, connection strength of the assembly with the suspension will increase.

Thereafter, the terminals electrodes 21a–21d of the magnetic head slider 21 are electrically connected to the head element connection pads 29a–29d by Au ball-bonding for example, respectively.

Since the assembly has a simple shape, the above-mentioned processes of fixing by means of adhesion or laser welding and electrical connection of the assembly with the suspension can be performed by using a general HGA assembling equipment resulting the productivity to extremely improve and thus the manufacturing cost to reduce.

As aforementioned, in this embodiment, the bending is performed in a region of the first resin layer 72a not in a region of the metal plate member 72b and the metal plate member 72b for the base section 40 and the metal plate member 72b for the movable arms 42 and 43 are fixed with each other by adhering. Thus, the bending process can become extremely easy even when the metal plate member 72b thickens to 50 to 70 µm or more.

Also, the actuator 22 in this embodiment holds the magnetic head slider 21 by adhering its coupling section 41 to the surface opposite to the ABS of the slider 21. Since the magnetic head slider 21 is fixed to the coupling section 41, fixing of the slider can be achieved with sufficient strength and a shock resistance against up-and-down movements can be greatly improved. Further, magnetic head sliders with different widths can be easily mounted to the actuator.

Because of a partial fixing of the magnetic head slider 21 to the coupling section 41 of the actuator 22, shape change in the ABS of the magnetic head slider 21 (generation of crown or camber) can be prevented from occurring even if the adhesive deforms due to change in atmosphere temperature. The fixing strength is more increased because the adhesive is also applied to the side surfaces of the magnetic head slider 21. In case of using a conductive adhesive, the body of the magnetic head slider 21 can be easily grounded through the actuator 22.

The actuator 22 in this embodiment is fixed to the suspension by adhering its base section 40 to the tongue of the flexure 26 using an adhesive.

Via holes 40a and 41a respectively formed through the base section 40 and the coupling section 41 are utilized such that, when a UV (ultra violet) curing resin adhesive is used for fixing, a UV light for curing can be directly radiated to the adhesive. Also, via holes 42g and 43g formed through the top end sections of the movable arms 42 and 43 respectively are utilized such that, when a UV curing resin adhesive is used for fixing, a UV light for curing can be directly radiated to the adhesive. The via holes 40a and 41a may be utilized for positioning the actuator when fixing because coordinates of the actuator will be defined by a line between the centers of these via holes.

The height of the actuator 22 should be determined to be equal to or less than that of the magnetic head slider 22 so that the total height of the HGA will not increase even if the actuator is assembled in the HGA. In other words, the height of the actuator 22 can be increased to that of the magnetic head slider 22 so as to improve the strength of the actuator itself without increasing the total HGA height.

As aforementioned, since the base section 40 and main portions of the movable arms 42 and 43 of the actuator 22 in this embodiment are made from a metal plate, the weight of the whole actuator can be reduced and thus a mechanical resonance frequency of the actuator can be increased. Also, as the basic member is formed by the metal plate that is strong and light-weighted, a shock resistance of the movable arms 42 and 43 which are particularly weaken for the shock can be greatly improved.

Due to the usage of the metal plate provided with a high mechanical strength, treatment of the actuator during assembling of the HGA become very easy. By using the metal plate to form the main portion of the actuator, the flexibility on a design of the actuator will improve with the shape and/or size. Thus, not only it is enabled to design the actuator with a sufficient stroke, but also it is possible to align the center of the magnetic head slider 21 and the load point or dimple position with the center of the actuator 22 resulting the flying performance of the magnetic head slider 21 to be extremely stabilized. Because the metal plate can be precisely machined, accuracy in size of the actuator 22 itself can be greatly improved.

Furthermore, since the actuator 22 in this embodiment holds the magnetic head slider 21 such that the slider 21 is mounted in a space between the movable arms 42 and 43, the thickness of the HGA around the magnetic head slider does not increase even if the actuator 22 is attached. Thus, no modifications in size of the magnetic disk drive apparatus due to the mounting of the actuator is necessary.

In addition, since the magnetic head slider 21 is caught in between the movable arms 42 and 43, the top end sections of the movable arms 42 and 43, which actually transfer the displacement to the slider 21, can be extended to always position at the top end of the slider 21. Thus, it is possible to provide a constant travel to the slider even if the size of the magnetic head slider 21 changes, and therefore an enough stroke of the magnetic head at the precise positioning operation can be always obtained.

Figure 9A:
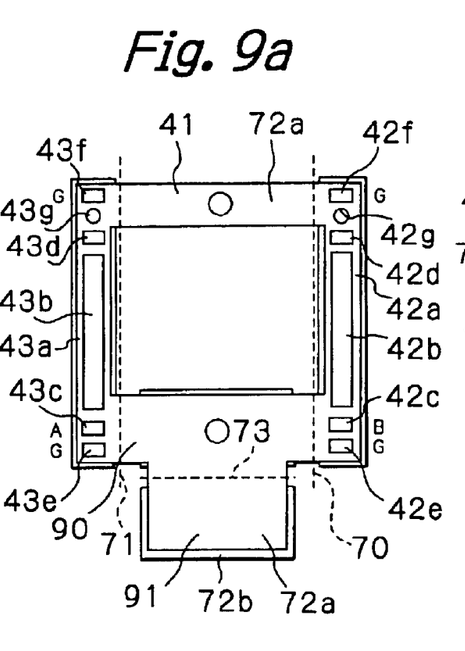
FIGS. 9a and 9b are top and bottom views illustrating an actuator in a state before bending in another embodiment according to the present invention.
Figure 9B:
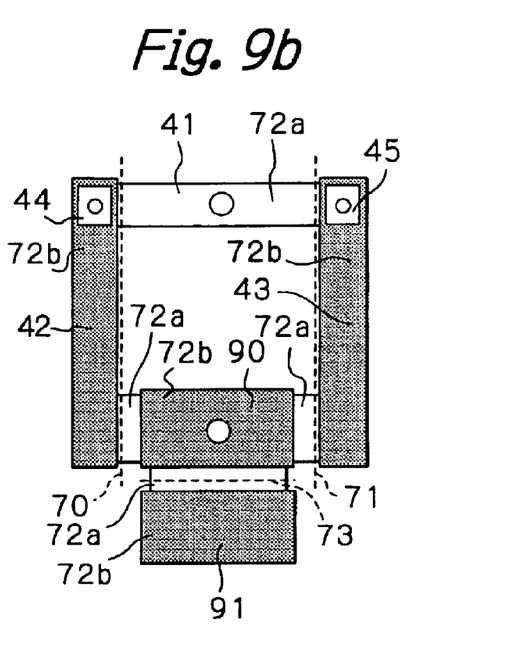

FIGS. 9a and 9b illustrate an actuator in a state before bending in another embodiment according to the present invention.

These figures indicate a flat state actuator before bending, and particularly FIG. 9a indicates a top surface to be fixed to the flexure 26 and FIG. 9b indicates a top surface to be fixed to the magnetic head slider 21. The actuator is formed in fact by outwardly bending its parts along broken lines 70 and 71 in FIG. 9a and by inwardly bending its parts along the broken lines 70 and 71 in FIG. 9b.

If the metal plate member for the base section 40 and the movable arms 42 and 43 of the actuator 22 are patterned by etching, side edges of the metal plate member are formed in tapered shapes. Thus, it will be difficult to perpendicularly fix the metal plate member for the base section 40 and the metal plate members for the movable arms 42 and 43 to each other. Therefore, in this embodiment, as for the metal plate member for the base section 40, a folding metal plate 91 separated from an original metal plate 90 for the base section 40 is additionally formed, and this folding metal plate 91 is folded to be laminated on the original metal plate 90. These original and folding metal plates 90 and 91 are coupled by the first resin layer 72a, and bent outwardly in FIG. 9a and inwardly in FIG. 9b along a broken line 73 in a region of the first resin layer 72a. Since tops of the side edges of both the original and folding metal plates 90 and 91 abut to the metal plate member for the movable arms 42 and 43 when bending, it is easy to perpendicularly fix the metal plate member for the base section 40 and the metal plate members for the movable arms 42 and 43 to each other.

Other configurations, operations, advantages and modifications in this embodiments are the same as those in the embodiment of FIG. 1. Also, in FIGS. 9a and 9b of this embodiment, the similar elements as those in the embodiments of FIG. 1 and in its modifications are represented by the same reference numerals.

Figure 10A:
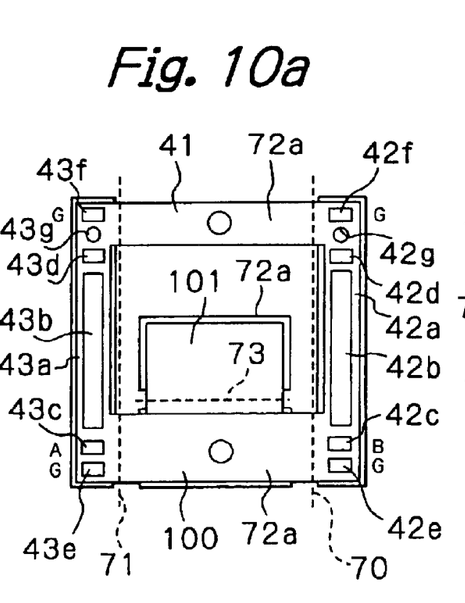
FIGS. 10a and 10b are top and bottom views illustrating an actuator in a state before bending in a further embodiment according to the present invention.
Figure 10B:
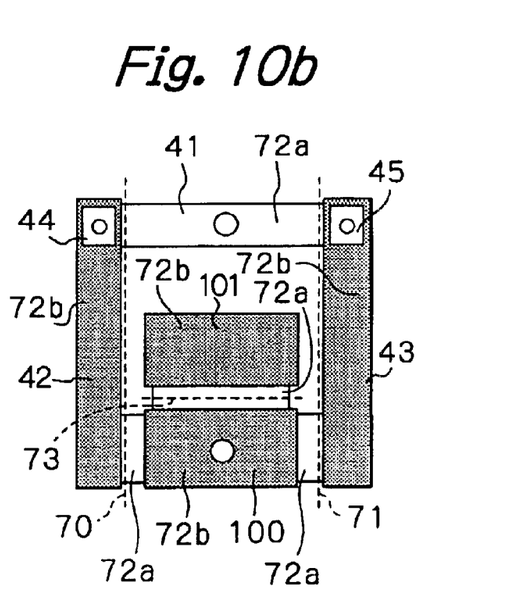

FIGS. 10a and 10b illustrate an actuator in a state before bending in a further embodiments according to the present invention.

These figures indicate a flat state actuator before bending, and particularly FIG. 10a indicates a top surface to be fixed to the flexure 26 and FIG. 10b indicates a top surface to be fixed to the magnetic head slider 21. The actuator is formed in fact by outwardly bending its parts along broken lines 70 and 71 in FIG. 10a and by inwardly bending its parts along the broken lines 70 and 71 in FIG. 10b.

Configuration of this embodiment is the same as that of the embodiment of FIGS. 9a and 9b except that a folding metal plate 101 is located in a frame of the actuator. Namely, in this embodiment, as for the metal plate member for the base section 40, the folding metal plate 101 separated from an original metal plate 100 for the base section 40 is additionally formed, and this folding metal plate 101 is folded to be laminated on the original metal plate 100. These original and folding metal plates 100 and 101 are coupled by the first resin layer 72a, and bent outwardly in FIG. 10a and inwardly in FIG. 10b along a broken line 73 in a region of the first resin layer 72a. Since tops of the side edges of both the original and folding metal plates 100 and 101 abut to the metal plate members for the movable arms 42 and 43 when bending, it is easy to perpendicularly fix the metal plate member for the base section 40 and the metal plate members for the movable arms 42 and 43 to each other.

Other configurations, operations, advantages and modifications in this embodiment are the same as those in the embodiment of FIG. 1. Also, in FIGS. 10*a* and 10*b* of this embodiment, the similar elements as those in the embodiments of FIG. 1 and in its modifications are represented by the same reference numerals.

In the aforementioned embodiments, the precise positioning actuators for the thin-film magnetic head elements and the HGAs with the actuators are described. However, it is apparent that the present invention can be applied to a precise positioning actuator for a head element such as an optical head element other than the thin-film magnetic head element and an HGA with the actuator.

Many widely different embodiments of the present invention may be constructed without departing from the spirit and scope of the present invention. It should be understood that the present invention is not limited to the specific embodiments described in the specification, except as defined in the appended claims.

What is claimed is:

1. A precise positioning actuator to be fixed to a head slider provided with at least one head element and to a support, for precisely positioning said at least one head element, said actuator comprising:

a pair of movable arms each formed by a plate member including a first metal plate to be substantially in parallel with a side surface of said head slider, top end sections of said pair of movable arms being capable of displacing in response to a drive signal applied to said actuator along a direction crossing planes of said metal plates;

a base section connected between rear end sections of said pair of movable arms and formed by a plate member including a second metal plate; and base section coupling members made of a resin layer for coupling said pair of movable arms and said base section that are individually formed, said base section coupling members being bent so that said pair of movable arms are substantially perpendicular to said base section, said base section and said pair of movable arms being formed by adhering said first metal plates and said second metal plate.

2. The actuator as claimed in claim 1, wherein said resin layer is laminated on outer surfaces of said pair of movable arms and said base section.

3. The actuator as claimed in claim 2, wherein said resin layer is a polyimide resin layer.

4. The actuator as claimed in claim 1, wherein said actuator further comprises spacers formed on inner surfaces of said top end sections of said pair of movable arms, said spacers being to be fixed to said side surfaces of said head slider so as to provide air gaps between said side surfaces of said head slider and said pair of movable arms, respectively.

5. The actuator as claimed in claim 4, wherein said spacers are individually formed from said pair of movable arms.

6. The actuator as claimed in claim 4, wherein each of said spacers is formed by a part of a resin layer of said movable arm.

7. The actuator as claimed in claim 6, wherein said resin layer is a polyimide resin layer.

8. The actuator as claimed in claim 1, wherein said actuator further comprises a coupling section connected between said top end sections of said pair of movable arms and substantially in parallel with an upper surface of said head slider, said upper surface being opposite to an air bearing surface of said head slider, said upper surface of said head slider being to be fixed to said coupling section.

9. The actuator as claimed in claim 8, wherein said coupling section is formed only by said resin layer.

10. The actuator as claimed in claim 9, wherein said resin layer is a polyimide resin layer.

11. The actuator as claimed in claim 8, wherein said pair of movable arms, said base section and said coupling section have a U-shaped section structure.

12. The actuator as claimed in claim 1, wherein said plate member is a stainless steel plate.

13. The actuator as claimed in claim 1, wherein each of said pair of arms comprises an arm member made of the plate member including the first metal plate, and a piezoelectric element formed or adhered on a side surface of said arm member.

14. The actuator as claimed in claim 1, wherein said at least one head element is at least one thin-film magnetic head element.

15. A head gimbal assembly including a head slider provided with at least one head element, a support and a precise positioning actuator fixed to said head slider and to said support for precisely positioning said at least one head element, said actuator comprising:

a pair of movable arms each formed by a plate member including a first metal plate to be substantially in parallel with a side surface of said head slider, top end sections of said pair of movable arms being capable of displacing in response to a drive signal applied to said actuator along a direction crossing planes of said metal plates;

a base section connected between rear end sections of said pair of movable arms and formed by a plate member including a second metal plate; and base section coupling members made of a resin layer for coupling said pair of movable arms and said base section that are individually formed, said base section coupling members being bent so that said pair of movable arms are substantially perpendicular to said base section, said base section and said pair of movable arms being formed by adhering said first metal plates and said second metal plate.

16. The head gimbal assembly as claimed in claim 15, wherein said resin layer is laminated on outer surfaces of said pair of movable arms and said base section.

17. The head gimbal assembly as claimed in claim 16, wherein said resin layer is a polyimide resin layer.

18. The head gimbal assembly as claimed in claim 15, wherein said actuator further comprises spacers formed on inner surfaces of said top end sections of said pair of movable arms, said spacers being fixed to said side surfaces of said head slider so as to provide air gaps between said side surfaces of said head slider and said pair of movable arms, respectively.

19. The head gimbal assembly as claimed in claim 18, wherein said spacers are individually formed from said pair of movable arms.

20. The head gimbal assembly as claimed in claim 18, wherein each of said spacers is formed by a part of a resin layer of said movable arm.

21. The head gimbal assembly as claimed in claim 20, wherein said resin layer is a polyimide resin layer.

22. The head gimbal assembly as claimed in claim 15, wherein said actuator further comprises a coupling section connected between said top end sections of said pair of movable arms and substantially in parallel with an upper surface of said head slider, said upper surface being opposite to an air bearing surface of said head slider, said upper surface of said head slider being fixed to said coupling section.

23. The head gimbal assembly as claimed in claim 22, wherein said coupling section is formed only by said resin layer.

24. The head gimbal assembly as claimed in claim 23, wherein said resin layer is a polyimide resin layer.

25. The head gimbal assembly as claimed in claim 22, wherein said pair of movable arms, said base section and said coupling section have a U-shaped section structure.

26. The head gimbal assembly as claimed in claim 15, wherein said plate member is a stainless steel plate.

27. The head gimbal assembly as claimed in claim 15, wherein each of said pair of movable arms comprises an arm member made of the plate member including the first metal plate, and a piezoelectric element formed or adhered on a side surface of said arm member.

28. The head gimbal assembly as claimed in claim 15, wherein said at least one head element is at least one thin-film magnetic head element.

29. A manufacturing method of a precise positioning actuator to be fixed to a head slider provided with at least one head element and to a support, for precisely positioning said at least one head element, said method comprising the steps of:
   forming, from a plate member fabricated by laminating at least one resin layer and at least one metal plate, a pair of movable arms each including a part of said at least one metal plate and a displacement generation element formed on one surface of the movable arm, and a base section connected between rear end sections of said pair of movable arms and including a part of said at least one metal plate separated from the parts of said at least one metal plates of said pair of movable arms by a predetermined space;
   forming, from said plate member, a base section coupling member made of said at least one resin layer to couple said pair of movable arms and said base section;
   bending said base section coupling member so that said pair of movable arms become substantially perpendicular to said base section; and
   adhering said base section and said pair of movable arms with each other under the bending state of said base section coupling member.

30. The manufacturing method as claimed in claim 29, wherein said forming steps comprise steps of etching said plate member.

31. The manufacturing method as claimed in claim 29, wherein said method further comprises a step of forming spacers on inner surfaces of top end sections of said pair of movable arms, said spacers being to be fixed to side surfaces of said head slider so as to provide air gaps between said side surfaces of said head slider and said pair of movable arms, respectively.

32. The manufacturing method as claimed in claim 31, wherein said spacers forming step comprises etching said plate member to remain parts of the resin layers of said pair of movable arms.

33. The manufacturing method as claimed in claim 31, wherein said spacers forming step comprises preparing members individually formed from said pair of movable arms, and adhering said members to the inner surfaces of the top end sections of said pair of movable arms.

34. The manufacturing method as claimed in claim 29, wherein said method further comprises a step of forming a coupling section connected between top end sections of said pair of movable arms and substantially in parallel with an upper surface of said head slider, said upper surface being opposite to an air bearing surface of said head slider, said upper surface of said head slider being to be fixed to said coupling section.

35. The manufacturing method as claimed in claim 34, wherein said coupling section is made of only said at least one resin layer.

36. The manufacturing method as claimed in claim 29, wherein said predetermined space is larger than a thickness of said at least one metal plate.

37. The manufacturing method as claimed in claim 29, wherein said base section is formed by folding said at least one metal plate.

* * * * *